(12) United States Patent
Ueki et al.

(10) Patent No.: US 8,771,860 B2
(45) Date of Patent: Jul. 8, 2014

(54) LITHIUM SECONDARY BATTERY AND METHOD FOR MANUFACTURING SAME

(75) Inventors: Tomoyoshi Ueki, Toyota (JP); Yusuke Fukumoto, Moriguchi (JP); Harunari Shimamura, Moriguchi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/122,173

(22) PCT Filed: Jun. 11, 2010

(86) PCT No.: PCT/JP2010/059933
§ 371 (c)(1),
(2), (4) Date: Apr. 1, 2011

(87) PCT Pub. No.: WO2011/155060
PCT Pub. Date: Dec. 15, 2011

(65) Prior Publication Data
US 2013/0101876 A1    Apr. 25, 2013

(51) Int. Cl.
*H01M 2/18* (2006.01)
*H01M 10/04* (2006.01)
*H01M 4/13* (2010.01)

(52) U.S. Cl.
USPC ............ 429/145; 429/94; 429/126; 429/246; 29/623.5; 180/65.1

(58) Field of Classification Search
USPC ................. 429/94, 126, 246, 145; 29/623.5; 180/65.1
See application file for complete search history.

(56) References Cited

U.S. PATENT DOCUMENTS

| | | | |
|---|---|---|---|
| 2005/0266305 A1 | 12/2005 | Ohata et al. | |
| 2006/0222943 A1 | 10/2006 | Fujikawa et al. | |
| 2006/0281006 A1 | 12/2006 | Fujino et al. | |
| 2007/0122715 A1 | 5/2007 | Fujino et al. | |
| 2007/0254209 A1* | 11/2007 | Baba et al. | 429/129 |
| 2009/0136848 A1 | 5/2009 | Minami et al. | |
| 2009/0246614 A1 | 10/2009 | Kim et al. | |
| 2010/0009265 A1* | 1/2010 | Hatayama et al. | 429/254 |

FOREIGN PATENT DOCUMENTS

| | | |
|---|---|---|
| CN | 101546822 | 9/2009 |
| JP | 56-32674 | 4/1981 |
| JP | 4-342954 | 11/1992 |
| JP | 9-190814 | 7/1997 |
| JP | 10-255847 | 9/1998 |
| JP | 2004-7149 | 1/2004 |

(Continued)

OTHER PUBLICATIONS

Machine Translation of JP 2005-078994.*

*Primary Examiner* — Jonathan Jelsma
(74) *Attorney, Agent, or Firm* — Finnegan, Henderson, Farabow, Garrett & Dunner, LLP

(57) ABSTRACT

A lithium secondary battery provided by the present invention includes a spirally wound electrode body in which a positive electrode sheet and a negative electrode sheet are spirally wound with a separator sheet 40 interposed therebetween, wherein on a sheet surface of at least any one from among the positive electrode sheet, negative electrode sheet, and separator sheet 40 constituting the spirally wound electrode body, a porous layer 60 is formed along a longitudinal direction of the sheet 40, and the porous layer 60 is thicker in a spiral winding direction of the spirally wound electrode body in a winding center portion 62 than in a winding outer portion 64.

12 Claims, 6 Drawing Sheets

(56) References Cited

FOREIGN PATENT DOCUMENTS

| | | |
|---|---|---|
| JP | 2004-071497 | 3/2004 |
| JP | 2005-56681 | 3/2005 |
| JP | 2005-78994 | 3/2005 |
| JP | 2005-93375 | 4/2005 |
| JP | 2006-313737 | 11/2006 |
| JP | 2008-53206 | 3/2008 |
| JP | 2008-159385 | 7/2008 |
| WO | WO 2005/067079 A1 | 7/2005 |
| WO | WO 2005/067080 A1 | 7/2005 |
| WO | WO 2005/117169 A1 | 12/2005 |

* cited by examiner

F I G. 1
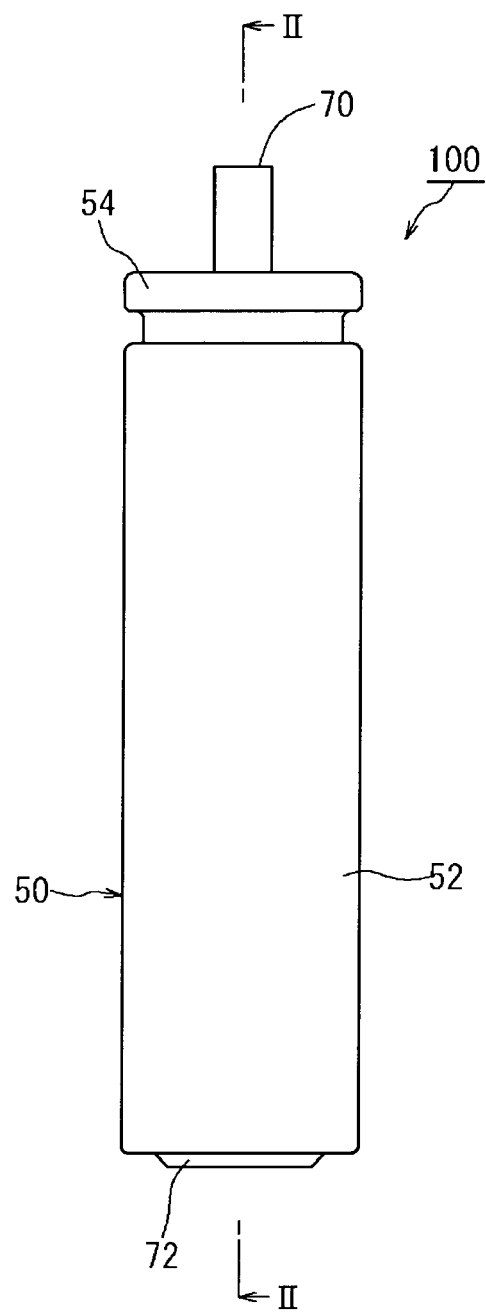

LITHIUM SECONDARY BATTERY AND METHOD FOR MANUFACTURING SAME

CROSS-REFERENCE TO RELATED APPLICATIONS

This application is a national phase application of International Application No. PCT/JP2010/059933, filed Jun. 11, 2010, the contents of which are incorporated herein by reference.

TECHNICAL FIELD

The present invention relates to a lithium secondary battery, and more particularly to a lithium secondary battery with increased endurance in charge/discharge cycles and a method for manufacturing the same.

BACKGROUND ART

In recent years the importance of lithium ion batteries, nickel hydride batteries, and other secondary batteries as onboard power sources for vehicles and power sources for personal computers and portable terminals has increased. In particular, lightweight lithium ion batteries that make it possible to obtain a high energy density are expected to be advantageously used as high-output batteries for vehicles. In a typical configuration of a lithium ion battery, charging and discharging is performed by lithium ions traveling between a positive electrode and a negative electrode. The conventional technology relating to secondary batteries of this kind is described for example in Patent Documents 1 to 4.

Patent Document 1: WO 2005/067080
Patent Document 2: Japanese Patent Application Publication No. 2004-07149
Patent Document 3: Japanese Patent Application Publication No. 04-342954
Patent Document 4: WO 2005/067079

In the applications of lithium ion batteries, they are sometimes assumed to be used in a high-rate charge/discharge cycling mode (high-speed charging and discharging). A lithium ion battery that is to be used as a power source of a vehicle (for example, a lithium ion battery installed on a hybrid vehicle that is used together with another power source of a different operation principle, as in a combination of a lithium ion battery and an internal combustion engine) is a typical example of lithium ion batteries for which such usage mode is assumed. However, although typical conventional lithium ion batteries demonstrate comparatively high endurance in high-rate charge/discharge cycles, a charge/discharge pattern in which high-rate charging and discharging is repeated is known to cause easily performance deterioration (decrease in battery capacity and the like).

DISCLOSURE OF THE INVENTION

With the foregoing in view, it is the main object of the present invention to provide a lithium secondary battery with increased endurance in charge/discharge cycles.

A phenomenon according to which continuous repeating of discharging and charging in a lithium secondary battery including a spirally wound electrode body causes significant decrease in battery capacity has attracted the attention of the inventors of the present application. Accordingly, the effect produced by such charge/discharge cycles on a lithium secondary battery has been thoroughly analyzed.

The results obtained demonstrated that in a lithium secondary battery with repeated charging and discharging, positional unevenness (nonuniformity) occurs in the amount of nonaqueous electrolytic solution that has permeated into the spirally wound electrode body. More specifically, under the effect of expansion and shrinkage of a spirally wound electrode body caused by charging and discharging, part of the nonaqueous electrolytic solution that has permeated to the central portion of the spirally wound electrode body is pushed out to the outside of the spirally wound electrode body and the amount of electrolytic solution in the winding center portion decreases below the necessary level (that is, shortage of electrolytic solution occurs).

Where such shortage of electrolytic solution occurs in the electrolytic solution, the amount of electrolytic solution in the electrode during charging and discharging in the winding center portion is insufficient and therefore the charge/discharge performance of the entire battery decreases. Further, since the battery reaction is concentrated in a portion where the amount of electrolytic solution is relatively large (that is, the winding outer portion), deterioration of this portion is accelerated. These phenomena can cause decrease in endurance of a lithium secondary battery in charge/discharge cycles (deterioration of battery capacity).

With this information in view, the present invention increases the endurance of a lithium secondary battery in charge/discharge cycles on the basis of an approach according to which shortage of electrolytic solution in the winding center portion of the spirally wound electrode body is eliminated or relaxed.

A lithium secondary battery provided by the present invention includes a spirally wound electrode body in which a positive electrode sheet and a negative electrode sheet are spirally wound with a separator sheet interposed therebetween. On a sheet surface of at least any one from among the positive electrode sheet, negative electrode sheet, and separator sheet constituting the spirally wound electrode body, a porous layer is formed along a longitudinal direction of the sheet. The porous layer is thicker in a spiral winding direction of the spirally wound electrode body in a winding center portion (area positioned on a winding center side) than in a winding outer portion (area positioned on a winding outer side).

With the configuration in accordance with the present invention, a porous layer is formed on the surface of at least any one sheet from among the positive electrode sheet, negative electrode sheet, and separator sheet, and the winding center portion of the porous layer is made thicker than the winding outer portion. Therefore, the amount of electrolytic solution permeating into the winding center portion of the spirally wound electrode body increases and liquid retention ability of the winding center portion improves. With such a configuration, even when the spirally wound electrode body is repeatedly expanded and shrunk by charging and discharging, the shortage of electrolytic solution occurring because the nonaqueous electrolytic solution is pushed out from the winding center portion can be inhibited and an adequate amount of electrolytic solution can be maintained in the winding center portion. As a result, the endurance in charge/discharge cycles (capacity retention ratio after charge/discharge cycles) can be increased.

According to an aspect disclosed herein, an average thickness of the porous layer formed in an area of up to 20% of the sheet, on which the porous layer is formed, from an end portion of the spirally wound electrode body on the winding center side in the spiral winding direction of the spirally wound electrode body is larger than an average thickness of the porous layer formed in an area of up to 20% from an end portion of the spirally wound electrode body on the winding outer side. As a result, the shortage of electrolytic solution occurring because the nonaqueous electrolytic solution is pushed out from the winding center portion can be inhibited more reliably.

In a preferred aspect disclosed herein, the porous layer is formed such as to increase gradually in thickness from the winding outer side to the winding center side of the spirally wound electrode body. As a result, the shortage of electrolytic solution occurring because the nonaqueous electrolytic solution is pushed out from the winding center portion can be inhibited more reliably.

In a preferred aspect disclosed herein, the porous layer has a thickest portion with a largest thickness and a thinnest portion with a smallest thickness. A difference in thickness between the thickest portion and the thinnest portion is preferably 2 µm to 4 µm. Where the difference in thickness is below this range (typically, less than 2 µm), the liquid retention effect of the winding center portion decreases and the above described cyclic endurance improvement effect sometimes cannot be obtained. Where the difference in thickness is above this range (typically, above 4 µm), the difference in distance between the electrode sheets in the winding center portion and winding outer side is too large, the battery reaction is uneven, and cyclic endurance tends to decrease.

It is preferred that a porosity of the porous layer be 45% to 65%. Where the porosity is below this range (typically below 45%), the porous layer itself acts as a resistance component and therefore cyclic endurance tends to decrease with respect to that attained without the porous layer. Where the porosity is above this range (typically above 65%), heat generation during the internal short circuit is sometimes impossible to inhibit sufficiently.

In a preferred aspect disclosed herein, the porous layer is formed on a surface of the separator sheet. It is preferred that the porous layer be formed on a surface of the separator sheet on a negative electrode sheet side. In this case, the production cost is reduced by comparison with that in the case in which the porous layer is formed on the negative electrode sheet surface and the porous layer can be formed without affecting the input-output characteristic.

The present invention also provides a method for manufacturing any of the lithium secondary batteries disclosed herein. The manufacturing method includes the step of coating and drying a coating material for forming a porous layer with coating means on a surface of at least any one traveling sheet from among a positive electrode sheet, negative electrode sheet, and separator sheet to form the porous layer, wherein the coating material for forming a porous layer is coated, while changing a traveling speed of the sheet. As a result, a porous layer with a thickness varying in the longitudinal direction (spiral winding direction of the spirally wound electrode body) can be easily formed.

The coating means is preferably a gravure roll. The coating material for forming a porous layer is coated, while changing a rotation speed of the gravure roll. As a result, a porous layer with a thickness varying in the longitudinal direction of the sheet (spiral winding direction of the spirally wound electrode body) can be easily formed.

Any of the lithium secondary batteries disclosed herein demonstrates performance suitable for a battery to be installed on a vehicle (for example, a high output can be obtained). In particular, excellent endurance in high-rate charge/discharge cycles can be obtained. Therefore, the present invention can provide a vehicle equipped with any of the lithium secondary batteries disclosed herein. In particular, a vehicle (for example, an automobile) provided with the lithium secondary battery as a power source (typically, a power source of a hybrid vehicle or an electric vehicle) is provided.

Examples of the preferred application objects of the features disclosed herein include a lithium secondary battery that can supposedly be used in charge/discharge cycles including a high-rate discharge at a current of equal to or higher than 50 A (for example 50 A to 250 A), and even equal to or higher than 100 A (for example 100 A to 200 A) and a lithium secondary battery that can supposedly be used in charge/discharge cycles including a high-rate charge/discharge of a high capacitance type with a theoretic capacitance of equal to or higher than 1 Ah (even equal to or higher than 3 Ah) and 2 C or above (for example 2 C to 50 C) and even 10 C or above (for example 10 C to 40 C).

BRIEF DESCRIPTION OF THE DRAWINGS

FIG. 1 is a side view illustrating schematically a lithium secondary battery according to one embodiment of the present invention.

BEST MODE FOR CARRYING OUT THE INVENTION

Figure 2:
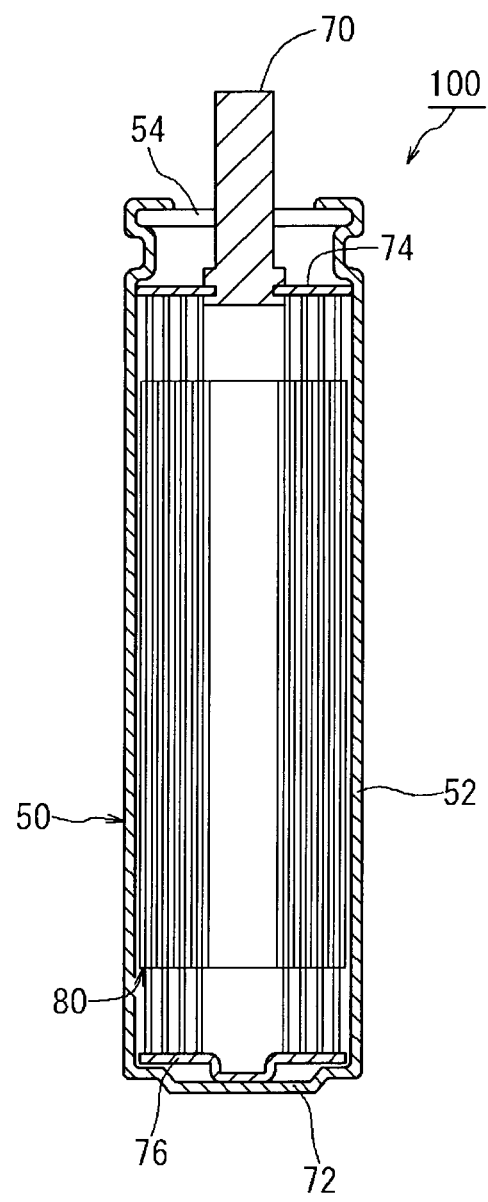
FIG. 2 is a sectional view along the II-II line in FIG. 1.

Embodiments of the present invention will be described below with reference to the appended drawings. In the drawings, members performing like action will be denoted with like reference numerals. The dimensional relationships (length, width, thickness, etc.) in the figures do not reflect actual dimensional relationships. Matters necessary for implementing the present invention (such as a configuration and a preparation method of the electrode body including the positive electrode and negative electrode, configuration and preparation method for the separator and electrolyte, and general features relating to the structure of a lithium secondary battery and other batteries), other than those matters specifically mentioned in the detailed description of the invention, can be understood by a person skilled in the art as design matters on the basis of the conventional features in the field.

The present invention will be explained below in greater detail by considering as an example a lithium secondary battery (lithium ion battery) of a form in which an electrode body that has been spirally wound (spirally wound electrode body) and a nonaqueous electrolytic solution are accommodated in a cylindrical container. However, this example is not intended to be limiting.

Figure 3:
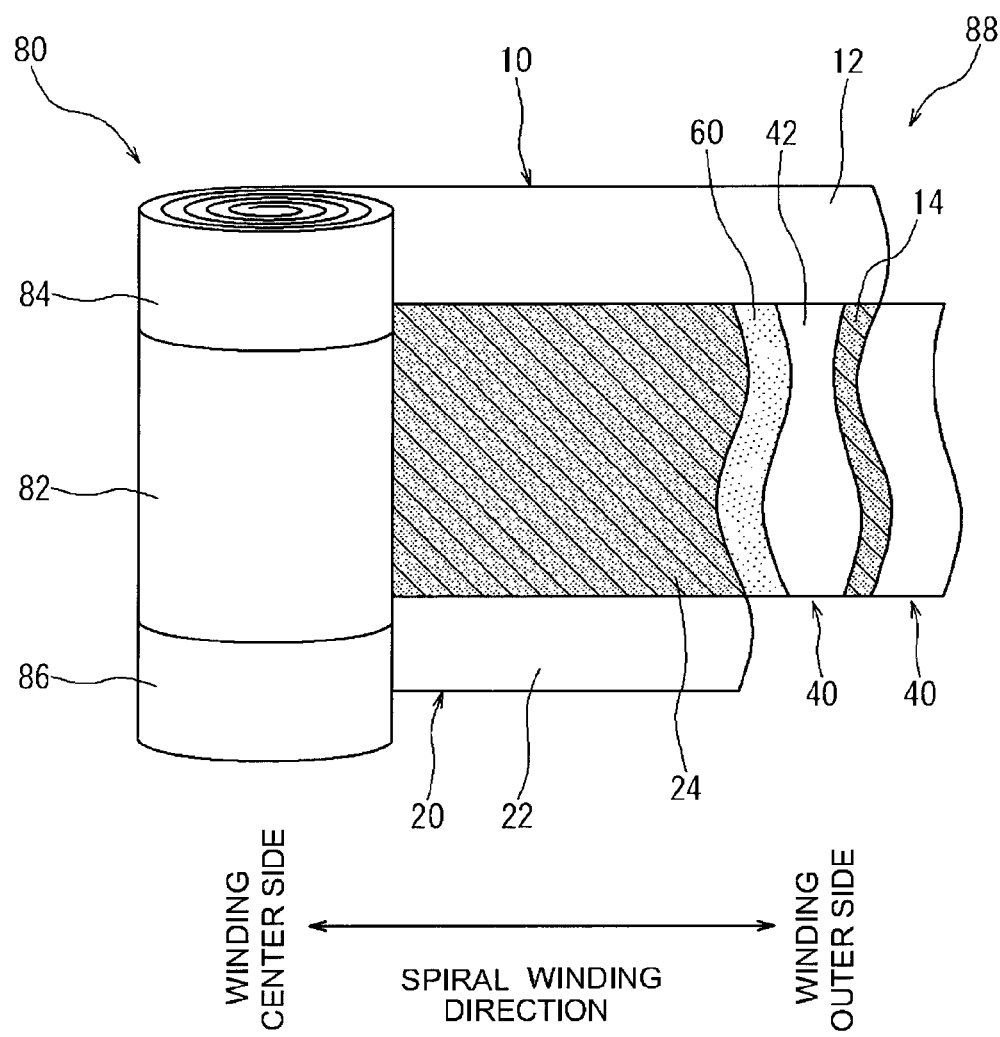
FIG. 3 shows schematically a spirally wound electrode body of the lithium secondary battery of one embodiment of the present invention.

FIGS. 1 to 3 show a schematic configuration of a lithium ion battery of an embodiment of the present invention.

A lithium secondary battery 100 has a configuration in which an electrode body (spirally wound electrode body) 80 in which an elongated positive electrode sheet 10 and an elongated negative electrode sheet 20 are spirally wound with an elongated separator sheet 40 interposed therebetween, and a nonaqueous electrolytic solution (not shown in the figure) are accommodated in a container 50 of a shape (cylindrical) that can accommodate the spirally wound electrode body 80.

The container 50 has a one-end cylindrical container body 52 that is open at the upper end and a lid body 54 closing the opening thereof. A metal material such as aluminum, steel and Ni-plated SUS (in the present embodiment, Ni-plated SUS) can be advantageously used as a material constituting the container 50. Alternatively, the container 50 formed from a resin material such as PPS and polyimide resins may be also used. A positive electrode terminal 70 electrically connected to the positive electrode 10 of the spirally wound electrode body 80 is provided at the upper surface (that is, lid body 54) of the container 50. A negative electrode terminal 72 (in the present embodiment, the container body 52 also serves as the negative electrode terminal) electrically connected to the negative electrode 20 of the spirally wound electrode body 80 is provided at the lower surface of the container 50. The spirally wound electrode body 80 is accommodated together with the nonaqueous electrolytic solution (not shown in the figure) inside the container 50.

With the exception of the below-described configuration of the separator 40, the spirally wound electrode body 80 of the present embodiment is similar to the spirally wound electrode body of the usual lithium ion battery and, as shown in FIG. 3, has an elongated sheet structure (sheet-like electrode body) 88 at a stage before the spirally wound electrode body 80 is assembled.

The positive electrode sheet 10 has a structure in which a positive electrode active material layer 14 including a positive electrode active material is held on both surfaces of a foil-like positive electrode collector 12 of an elongated sheet form. However, the positive electrode active material layer 14 is not bonded to one side edge (lower side edge portion in the figure) along one side in the lateral direction of the positive electrode sheet 10, and a portion of a predetermined width is formed in which the positive electrode active material layer is not present and the positive electrode collector 12 is exposed.

Similarly to the positive electrode sheet 10, the negative electrode sheet 20 also has a structure in which a negative electrode active material layer 24 including a negative electrode active material layer is formed on both surface of a foil-like negative electrode collector 22 of an elongated sheet form. However, the negative electrode active material layer 24 is not bonded to one side edge (upper side edge portion in the figure) along one side in the lateral direction of the negative electrode sheet 20, and a portion of a predetermined width is formed in which the negative electrode active material layer is not present and the negative electrode collector 22 is exposed.

When the spirally wound electrode body 80 is fabricated, as shown in FIG. 3, the positive electrode sheet 10 and the negative electrode sheet 20 are laminated, with two separator sheets 40 being interposed therebetween, and a sheet-like electrode body 88 is produced. In this case, the positive electrode sheet 10 and the negative electrode sheet 20 are superimposed with a certain displacement in the lateral direction, so that the portion of the positive electrode sheet 10 where the positive electrode active material layer has not been formed and the portion of the negative electrode sheet 20 where the negative electrode active material layer has not been formed protrude from the respective sides in the lateral direction of the separator sheet 40. The spirally wound electrode body 80 can be produced by spirally winding the sheet-like electrode body 88 that has been produced by such overlapping.

In the central portion of the spirally wound electrode body 80 in the winding axis direction, a spirally wound core portion 82 (that is, a portion in which the positive electrode active material layer 14 of the positive electrode sheet 10, the negative electrode active material layer 24 of the negative electrode sheet 20, and the separator sheet 40 are tightly laminated) is formed. At both ends of the spirally wound electrode body 80 in the winding axis direction, the portions of the positive electrode sheet 10 and negative electrode sheet 20 where the electrode active material layers have not been formed protrude to the outside from the winding core portion 82. A positive electrode lead terminal 74 and a negative electrode lead terminal 76 are attached to a protruding portion (that is, a portion where the positive electrode active material 14 has not been formed) 84 on the positive electrode side and a protruding portion (that is, a portion where the negative electrode active material layer 24 has not been formed) 86 on the negative electrode side, respectively, and eclectically connected to the aforementioned positive electrode terminal 70 and negative electrode terminal 72 (in this configuration, the container body 52 serves as the negative electrode terminal), respectively.

With the exception of the separator sheet 40, the constituent elements constituting the spirally wound electrode body 80 are similar to those of the conventional spirally wound electrode body of a lithium ion battery and are not particularly limited. For example, the positive electrode sheet 10 can be formed by applying the positive electrode active material layer 14 containing a positive electrode active material layer for a lithium ion battery as a main component of the elongated positive electrode collector 12. A metal foil suitable for a positive electrode, such as an aluminum foil, can be advantageously used for the positive electrode collector 12. One, two, or more kinds of substances that have been conventionally used in lithium ion batteries can be used without particular limitations for the positive electrode active material. The preferred objects of applications disclosed herein include positive electrode active materials containing as the main component an oxide (lithium transition metal oxide) containing as constituent metal elements lithium and a transition metal oxide, such as lithium nickel oxide ($LiNiO_2$), lithium cobalt oxide ($LiCoO_2$), and lithium manganese oxide ($LiMn_2O_4$).

The negative electrode sheet 20 can be formed by applying the negative electrode active material layer 24 containing a negative electrode active material for a lithium ion battery as the main component of the elongated negative electrode collector 22. A metal foil suitable for a negative electrode, such as a copper foil, can be advantageously used for the negative electrode collector 22. One, two, or more kinds of substances that have been conventionally used in lithium ion batteries can be used without particular limitations for the negative electrode active material. The preferred examples include carbon-containing materials such as graphite carbon and amorphous carbon, lithium-containing transition metal oxides, and transition metal oxides.

The preferred separator sheet 40 used between the positive and negative electrode sheets 10, 20 is constituted by a porous polyolefin resin. For example, a porous separator made from a synthetic resin (for example, a polyolefin such as polyethylene) can be advantageously used.

In the present embodiment, as shown in FIG. 3, a porous layer 60 is formed on the surface of the separator sheet 40 constituting the spirally wound electrode body. The porous layer 60 is formed along the longitudinal direction of the separator sheet. In the present embodiment, the porous layer 60 is formed on a surface 46 of the separator sheet on the negative electrode sheet side, which is an interface of the separator sheet and the negative electrode sheet. The porous layer 60 is constituted by metal compound particles and a binder (binding agent), the binder serving to bind together the metal compound particles and also the metal compound particles and the separator sheet.

Where foreign matter penetrates into a spirally wound electrode body and small internal short circuit is generated, it can be assumed that the separator sheet will be melted by the heat generated by the short circuit and the internal short circuit will expand (leading to heat generation in the battery), but by providing the porous layer 60 at the interface of the separator sheet 40 and the negative electrode sheet 20 as mentioned hereinabove, it is possible to prevent the internal short circuit from spreading and inhibit heat generation in the battery.

Metal oxide particles that are heat resistant and electrochemically stable in the usage range of the battery are preferred as the metal compound particles constituting the porous layer. The preferred examples include alumina ($Al_2O_3$), alumina hydrate (for example, boehmite ($Al_2O_3 \cdot H_2O$)), magnesium hydroxide ($Mg(OH)_2$), and magnesium carbonate ($MgCO_3$). The metal compound particles of one kind or of two or more kinds can be used. Among them, alumina and alumina hydrate are preferred since they have a high Moss hardness and the endurance of the porous layer can be increased.

The binder used in the porous layer serves to bind the metal compound particles, and the material constituting the binder is by itself not particularly limited and a wide variety of materials can be used. Acrylic resins can be advantageously used as the binder. The preferred examples of acrylic resins include homopolymers obtained by polymerization of one monomer such as acrylic acid, methacrylic acid, acrylamides, methacrylamides, 2-hydroxyethylacrylate, 2-hydroxyethylmethacrylate, metaacrylate, methyl metaacrylate, ethyl hexyl acrylate, and butyl acrylate. The acrylic resins may be also copolymers obtained by polymerization of two or more kinds of the aforementioned monomers. Mixtures of two or more of the aforementioned homopolymers and copolymers may be also used. In addition to the aforementioned acrylic resins, polyvinylidene fluoride, polytetrafluoroethylene (PTFE), polyacrylonitrile, and polymethyl methacrylate can be also used.

It is preferred that the ratio of the metal compound particles in the entire porous layer be equal to or higher than about 90 wt % (typically 90 to 98 wt %), more preferably about 92 to 96 wt %, but this range is not limiting. The ratio of the binder in the entire porous layer is for example 2 to 10 wt %, preferably about 4 to 8 wt %.

Figure 4:
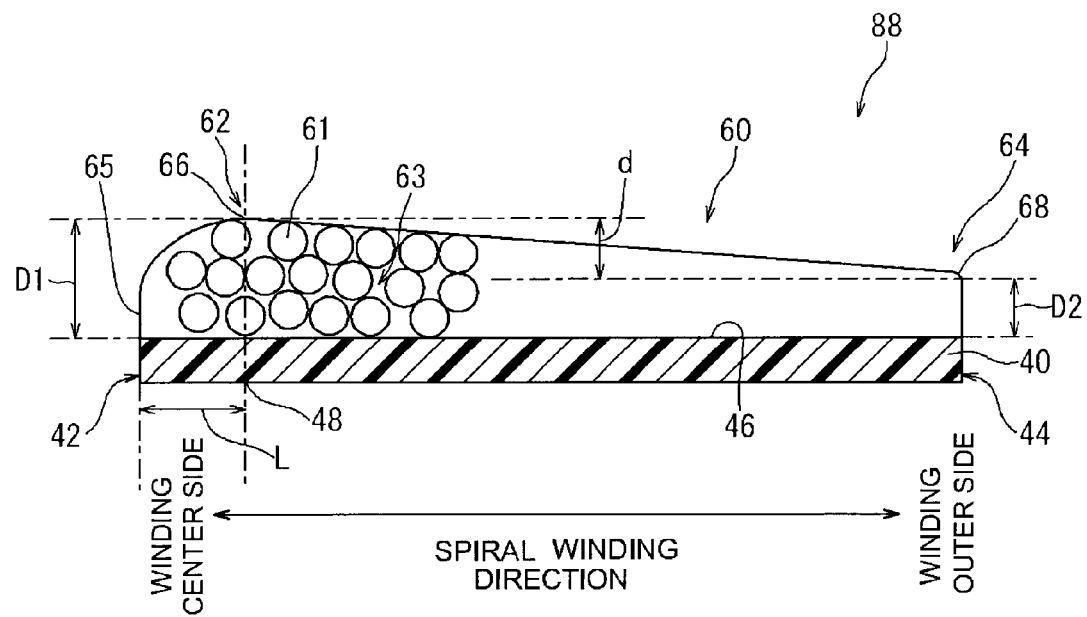
FIG. 4 is an enlarged cross-sectional view illustrating a principal portion of the sheet-like electrode body of the lithium secondary battery of one embodiment of the present invention.

The spirally wound electrode body 80 according to the present embodiment will be described below with reference to FIG. 4. FIG. 4 is a schematic cross-sectional view showing an enlarged portion of a section along the longitudinal direction of the sheet-like electrode body 88 at a stage before the spirally wound electrode body is constructed. This figure shows the separator sheet 40 and the porous layer 60 provided on the surface of the separator sheet 40. The left side in the figure is the winding center side (winding start side) and the right side in the figure is a winding outer side (winding end side).

As shown in FIG. 4, the porous layer 60 is formed along the longitudinal direction of the separator sheet 40. The porous layer 60 is constituted by metal compound particles 61 and a binder (not shown in the figure) serving to bind the metal oxide particles 61 together and the metal oxide particles 61 and the separator sheet 40. A larger number of pores 63 are formed in areas that are not bound by the binder between the adjacent metal compound particles 61, and a nonaqueous electrolytic solution can be retained in the pores 63 (thus, the nonaqueous electrolytic solution can permeate into the porous layer).

In the porous layer 60, a winding center portion (zone positioned on the winding center side) 62 is thicker than a winding outer portion (zone positioned on the winding outer side) 64 in the spiral winding direction of the spirally wound electrode body (longitudinal direction of the sheet 40). In the present embodiment, the porous layer 60 is formed such that the spirally wound electrode body is gradually getting thicker from the winding center side to the winding outer side. A thickness (D1) of the winding center portion 62 provided at one end in the spiral winding direction (longitudinal direction) of the porous layer is larger than a thickness (D2) of the winding outer portion 64 provided at the other end in the spiral winding direction (longitudinal direction) of the porous layer (D1>D2). With such a configuration, the amount of electrolytic solution permeating into the winding center portion of the spirally wound electrode body increases and liquid retention ability of the winding center portion increases.

In the conventional lithium secondary battery in which the porous layer is not formed, where charging and discharging is continuously and repeatedly performed, expansion and shrinkage of the spirally wound electrode body in the course of charging and discharging pushes part of the nonaqueous electrolytic solution that has permeated to the winding center portion of the spirally wound electrode body to the outside of the spirally wound electrode body. Therefore, the amount of nonaqueous electrolytic solution in the winding center portion decreases below the necessary amount and a shortage of electrolytic solution occurs. Where such a shortage of electrolytic solution occurs in the winding center portion, the amount of electrolytic solution in the electrodes during charging and discharging in the winding center portion becomes insufficient and therefore the charge/discharge performance of the entire battery decreases. Further, since the battery reaction is concentrated in a portion where the amount of electrolytic solution is relatively large (that is, winding outer portion), deterioration of this portion is accelerated. These phenomena can cause decrease in lithium secondary battery endurance in charge/discharge cycles (deterioration of battery capacity).

By contrast, in the present embodiment, the porous layer 60 (layer having pores 63 that can retain the nonaqueous electrolytic solution) is formed on the surface of the separator sheet 40, and the winding center portion 62 of the porous layer 60 is thicker than the winding outer portion 64. As a result, the amount of electrolytic solution permeating into the winding center portion of the spirally wound electrode body increases and liquid retention ability of the winding center portion increases. With such a configuration even when the spirally wound electrode body is repeatedly expanded and shrunk by charging and discharging, the occurrence of electrolytic solution shortage caused by the nonaqueous electrolytic solution being pushed out from the winding center portion can be inhibited and an adequate amount of electrolytic solution can be maintained in the winding center portion. As a result, endurance in charge/discharge cycles (for example, capacity retention ratio after charge/discharge cycles) can be increased.

The configuration in which the winding center portion 62 of the porous layer is made thicker than the winding outer portion 64 may be realized by making the average thickness of the porous layer 60 formed in an area of up to 20% of the sheet 40, on which the porous layer 60 has been formed, from an end portion 42 of the spirally wound electrode body on the winding center side in the spiral winding direction of the spirally wound electrode body larger than an average thickness of the porous layer 60 formed in an area of up to 20% from an end portion 44 of the spirally wound electrode body on the winding outer side. As a result, the shortage of electrolytic solution occurring because the nonaqueous electrolytic solution is pushed out from the winding center portion can be inhibited more reliably.

The porous layer in which the winding center portion 62 is thicker than the winding outer portion 64 may be also realized by forming the porous layer 60 such that gradually increases in thickness from the winding outer side to the spiral winding center side of the spirally wound electrode body. As a result, the shortage of electrolytic solution occurring because the nonaqueous electrolytic solution is pushed out from the winding center portion can be inhibited more reliably.

In the configuration disclosed herein, the porous layer 60 has a thickest portion 66 with the largest thickness and a thinnest portion 68 with the smallest thickness. In the present embodiment, the porous layer 60 has the thickest portion 66 with the largest thickness in the winding center portion 62 provided at one end in the spiral winding direction (longitudinal direction) of the porous layer and has the thinnest portion 68 with the smallest thickness in the winding outer portion 64 provided at the other end in the spiral winding direction (longitudinal direction) of the porous layer.

It is preferred that the difference in thickness between the thickest portion and the thinnest portion be 2 µm to 4 µm. Where the difference in thickness is below this range (typically, less than 2 µm), the liquid retention effect of the winding center portion decreases and the above described cyclic endurance improvement effect sometimes cannot be obtained. Where the difference in thickness is above this range (typically, above 4 µm), the difference in distance between the electrode sheets in the winding center portion and winding outer side is too large, the battery reaction is uneven, and cyclic endurance tends to decrease. The difference in thickness between the thickest portion and the thinnest portion is typically about 2 µm to 4 µm, preferably 2.5 µm to 4 µm, and especially preferably 3 µm to 4 µm. The thickness (D2) of the thinnest portion 68 is not particularly limited and generally may be equal to or greater than 2 µm (typically 2 µm to 10 µm, for example about 4 µm).

It is preferred that a porosity of the porous layer be 45% to 65%. Where the porosity is below this range (typically below 45%), the porous layer itself acts as a resistance component and therefore cyclic endurance tends to decrease with respect to that attained without the porous layer. Where the porosity is above this range (typically above 65%), heat generation during the internal short circuit is sometimes impossible to inhibit sufficiently. The porosity is typically 45% to 65%, preferably 50% to 65%, especially preferably 50% to 60%. The porosity can be calculated by the following Eq. (1) from a true volume V1 of the porous layer including no pores and an apparent volume V2 including the pores.

$$\text{Porosity}(\%) = [(V2 - V1)/V2] \times 100 \quad (1)$$

Here, the true volume V1 can be calculated from true densities of the metal compound particles and binder and a compounding ratio thereof. The apparent volume V2 can be determined from the outer dimensions (thickness and surface area) of the porous layer.

The separator sheet 40 has a winding left-off portion L (that is, a portion protruding from the end portion of the negative electrode sheet 20 on the winding center side) that is not opposite the negative electrode sheet 20 from and end portion 42 of the spirally wound electrode body on the winding center side to a predetermined position 48. This winding left-off portion L may be, for example, an extra winding portion for winding about a winding core. In this case, the thickness of the porous layer 60 formed in the winding left-off portion L is not particularly limited. In the present embodiment, in the region facing the negative electrode sheet, the thickest portion 66 is disposed on the centermost side of the spirally wound electrode body, and the porous layer formed in the winding left-off portion L is formed such as to decrease gradually in thickness from the thickest portion 66 toward the end portion 65 of the winding center side.

A method for forming the porous layer will be described below. The porous layer 60 disclosed herein can be formed for example by coating and drying a coating material for forming a porous layer in which metal compound particles, binder, and other components forming the porous layer are dispersed in an appropriate solvent (preferably, an organic solvent) in a band-like manner on one or both surfaces (in this configuration, one surface) of a separator sheet.

Examples of the solvent to be used in the coating material for forming the porous layer include organic solvents such as N-methylpyrrolidone (NMP), pyrrolidone, methyl ethyl ketone, methyl isobutyl ketone, cyclohexanone, toluene, dimethylformamide, and dimethylacetamide and combinations of two or more thereof. Alternatively, water or a mixed solvent based on water may be used. One or two or more organic solvents (lower alcohols, lower ketones, and the like) that can be uniformly mixed with water can be appropriately selected and used as solvents other than water constituting the aforementioned mixed solvent.

An operation (process) of coating such coating material for forming the porous layer on the surface of the separator sheet is not particularly limited, and a variety of such operations can be used. For example, the porous layer can be formed by coating a predetermined amount of the coating material for forming the porous layer on the separator sheet by using an appropriate coating device.

Figure 5:
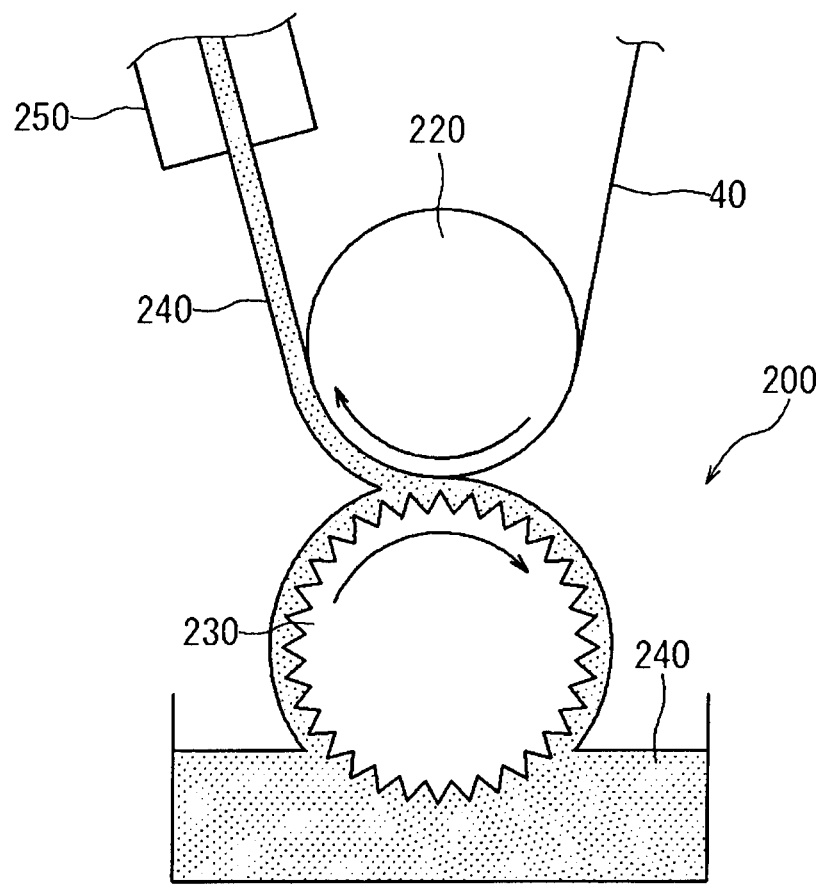
FIG. 5 shows schematically a coating device according to one embodiment of the present invention.

For example, a coating device 200 such as shown in FIG. 5 can be used for coating the coating material for forming the porous layer on the separator sheet. In the coating device 200, the separator sheet 40 is passed through a gap between a backup roll 220 and coating means 230, while being conveyed by the rotation of the backup roll 220, and a coating material 240 for forming the porous layer is coated from the coating means 230 along the longitudinal direction of the conveyed separator sheet. The solvent (for example, NMP) contained in the coating material 240 for forming the porous layer is then evaporated by passing the coated separator sheet through a drying furnace 250 and the porous layer 60 is formed.

In the present embodiment, the coating device 200 is a gravure coating device and the coating means 230 is a gravure roll. In this case, the coating material 240 for forming the porous layer applied to peaks and valleys of the surface of the gravure roll 230 is scraped off by a blade (not shown in the figure) and then transferred and coated on the surface of the separator sheet 40 traveling together with the backup roll 220 rotating in the same direction as the gravure roll 230.

In the present embodiment, it is important that the porous layer 60 be formed with a thickness varying in the longitudinal direction of the sheet. Such porous layer 60 can be formed for example, by coating the coating material for forming the porous layer on the surface of the traveling separator sheet 40, while changing the traveling speed of the sheet 40. Generally, where the supply rate from the coating means 230 is the same, the coating material for forming the porous layer is coated to a larger thickness as the traveling speed of the sheet decreases. Therefore, a porous layer with a thickness varying in the longitudinal direction of the sheet can be formed by coating the coating material for forming the porous layer, while changing the traveling speed of the sheet. In the present embodiment, the coating material for forming the porous layer is coated, while the traveling speed of the sheet is changed gradually. As a result, a porous layer can be formed with a thickness varying continuously in the longitudinal direction of the sheet.

Further, in the present embodiment, the gravure roll 230 is used as the coating means. In this case, the coating material for forming the porous layer may be coated, while changing the rotation speed of the gravure roll 230. Generally, where the traveling speed of the sheet 40 is the same, the coating material for forming the porous layer is coated to a larger thickness as the rotation speed of the gravure roll 230 increases. Therefore, a porous layer with a thickness varying in the longitudinal direction of the sheet can be formed by coating the coating material for forming the porous layer, while changing the rotation speed of the gravure roll. In the present embodiment, the coating material for forming the porous layer is coated, while gradually changing the rotation speed of the gravure roll. As a result, a porous layer can be formed with a thickness varying continuously in the longitudinal direction of the sheet.

Figure 6:
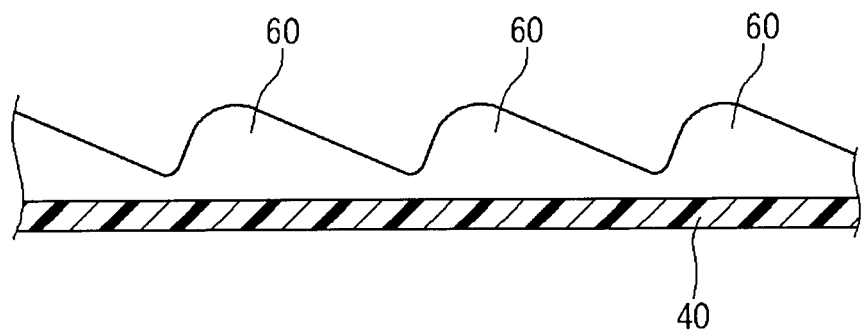
FIG. 6 shows schematically a porous layer formation process according to one embodiment of the present invention.

In the present embodiment, as shown in FIG. 6, the porous layer 60 corresponding to a plurality of batteries is continuously formed on the surface of the traveling sheet 40. With such a configuration, since the coating material for forming the porous layer is coated, while changing the traveling speed of the sheet (and the rotation speed of the gravure roll), the porous layer 60 that differs in thickness in the longitudinal direction of the sheet is continuously formed on the surface of the traveling sheet 40.

Once the porous layer 60 with a varying thickness has thus been formed on the surface of the separator sheet 40, the separator sheet 40 is cut to lengths corresponding to one individual battery. The spirally wound electrode body 80 is then obtained by spirally winding the positive electrode sheet 10 and negative electrode sheet 20, with two separator sheets 40 being interposed therebetween.

More specifically, the sheet-like electrode body 88 (FIG. 3) is produced by laminating the positive electrode sheet 10 and the negative electrode sheet 20, with two separator sheets 40 being interposed therebetween. In this case, the porous layer 60 (with the exception of the porous layer formed in the winding left-off portion L (FIG. 4)) formed on the surface of the separator sheet 40 and the negative electrode sheet 20 may be disposed opposite each other. The spirally wound electrode body 80 is then produced by spirally winding the sheet-like electrode body 88. In this case, the spiral winding may be performed such that the thickest portion 66 will be on the centermost side of the spirally wound electrode body in a region facing the negative electrode sheet 20. The production of the spirally wound electrode body 80 of the present embodiment is thus completed.

Then, as shown in FIG. 1 and FIG. 2, the spirally wound electrode body 80 of such a configuration is accommodated in the container body 52 and an appropriate nonaqueous electrolytic solution is placed (poured) into the container body 52. A nonaqueous electrolytic solution similar to those used in the conventional lithium secondary batteries can be used, without any particular limitation, as the nonaqueous electrolytic solution accommodated together with the spirally wound electrode body 80 in the container body 52. The nonaqueous electrolytic solution typically has a composition including a support salt in an appropriate nonaqueous solvent. Examples of suitable nonaqueous electrolytic solutions include ethylene carbonate (EC), ethyl methyl carbonate (EMC), dimethyl carbonate (DMC), diethyl carbonate (DEC), and propylene carbonate (PC). For example, a lithium salt such as $LiPF_6$, $LiBF_4$, $LiAsF_6$, $LiCF_3SO_3$, and $LiClO_4$ can be advantageously used as the support salt. For example, a nonaqueous electrolytic solution obtained by introducing $LiPF_6$ as a support salt to a concentration of about 1 mol/L to a mixed solvent including EC, EMC, and DMC at a volume ratio of 3:4:3 can be advantageously used.

The nonaqueous electrolytic solution is accommodated together with the spirally wound electrode body 80 in the container body 52 and the opening of the container body 52 is sealed with the lid body 54, thereby completing the production (assembly) of the lithium secondary battery 100 of the present embodiment. The processes of sealing the container body 52 and placing (pouring) the electrolytic solution can be performed in the same manner as in the methods used in the manufacture of conventional lithium secondary batteries. Conditioning (initial charging and discharging) of the battery is then performed. If necessary, a gas bleeding process and quality inspection may be performed.

Test examples relating to the present invention will be explained below, but the present invention is not intended to be limited to the battery shown in the test examples below.

TEST EXAMPLE 1

Fabrication of Coating Material for Forming a Porous Layer

An alumina powder with a mean particle size of 0.7 µm as the metal compound particles and a binder solution including acrylic resin as a binder were used, and the components were mixed in NMP to obtain a mass ratio of the alumina powder and binder of 95:5 and a solid fraction concentration of about 40 wt %. The coating material for a porous layer was then prepared in a high-speed kneading and dispersion device (CreaMix: manufactured by M Technique Co.) by preliminary kneading for 5 min at 15,000 rpm and then main kneading for 15 min at 20,000 rpm.

TEST EXAMPLE 2

Formation of Porous Layer

The coating material for forming a porous layer that has been prepared in the Test Example 1 was coated in a band-like manner with a gravure roll (kiss reverse system) on one surface of elongated separator sheets 40 (the sheets had a thickness of 20 µm and a polypropylene (PP)-polyethylene (PE)-polypropylene (PP) three-layer structure) and dried to form porous layers 60. In this case, porous layers 60 of five kinds (samples 1 to 5) with a thickness varying in the longitudinal direction of the sheet were formed by coating the coating material, while gradually changing a ratio (speed ratio=A/B) of the rotation speed B of the gravure roll to the traveling speed A of the separator sheet within a 1.1 to 1.5 range. The thickness D1 of the thickest portion, thickness D2 of the thinnest portion, and difference in thickness d are shown in Table 1.

TABLE 1

| | Porosity [%] | Thickest portion D1 [μm] | Thinnest portion D2 [μm] | Difference in thickness d between thickest portion and thinnest portion [μm] | Initial capacity [mAh] | Endurance characteristic, capacity retention ratio [%] | Separator | Safety, forced internal short circuit test |
|---|---|---|---|---|---|---|---|---|
| Sample 1 | 55 | 4 | 5 | 1 | 829.7 | 74 | PP/PE/PP | 0/5 |
| Sample 2 | 55 | 4 | 6 | 2 | 832.1 | 80 | PP/PE/PP | 0/5 |
| Sample 3 | 55 | 4 | 7 | 3 | 830.6 | 83 | PP/PE/PP | 0/5 |
| Sample 4 | 55 | 4 | 8 | 4 | 830.7 | 85 | PP/PE/PP | 0/5 |
| Sample 5 | 55 | 4 | 9 | 5 | 831.0 | 70 | PP/PE/PP | 0/5 |
| Sample 6 | 65 | 4 | 7 | 3 | 831.3 | 85 | PP/PE/PP | 0/5 |
| Sample 7 | 45 | 4 | 7 | 3 | 831.8 | 80 | PP/PE/PP | 0/5 |
| Sample 8 | 40 | 4 | 7 | 3 | 831.0 | 50 | PP/PE/PP | 0/5 |
| Sample 9 | 68 | 4 | 7 | 3 | 829.6 | 88 | PP/PE/PP | 1/5 |
| Sample 10 | 55 | 4 | 6 | 2 | 830.2 | 82 | PE monolayer | 0/5 |
| Sample 11 | 55 | 4 | 7 | 3 | 832.5 | 86 | PE monolayer | 0/5 |
| Sample 12 | 55 | 4 | 8 | 4 | 830.2 | 86 | PE monolayer | 0/5 |
| Sample 13 | 55 | 4 | 4 | 0 | 830.0 | 74 | PP/PE/PP | 0/5 |
| Sample 14 | No porous layer | — | — | — | 832.3 | 71 | PP/PE/PP | 3/5 |

In the present test example, porous layers 60 of four kinds that differed from each other in porosity (samples 6 to 9) were formed by changing drying conditions (drying rate) of the coating material for forming a porous layer. The porosity was calculated by using the aforementioned Eq. (1) from a true volume V1 of the porous layer including no pores and an apparent volume V2 including the pores. In the present test example, porous layers 60 of three kinds (samples 10 to 12) were formed by changing the separator structure into a monolayer structure of polyethylene (PE). Further, for comparison, a porous layer with a difference in thickness d=0 μm (that is, a constant thickness in the longitudinal direction) was also formed (sample 13).

TEST EXAMPLE 3

Fabrication of Lithium Secondary Battery

Lithium secondary batteries were fabricated by using separator sheets 40 provided with various porous layers 60 that have been fabricated in Test Example 2. The lithium secondary batteries were fabricated in the following manner.

A lithium nickel cobalt manganate ($LiNi_{1/3}Co_{1/3}Mn_{1/3}O_2$) powder with an average particle size of 5 μm as a positive electrode active material, acetylene black (AB) as an electrically conductive material, and polyvinylidene fluoride (PVdF) as a binder were mixed in NMP to obtain a mass ratio of the materials of 85:10:5, and a paste for forming a positive electrode active material layer was prepared. The paste for forming a positive electrode active material layer was coated in a band-like manner on both surfaces of an aluminum foil (positive electrode collector 12) of an elongated shape and a thickness of 15 μm and dried. As a result, the positive electrode sheet 10 was produced in which the positive electrode active material layer 14 was provided on both surfaces of the positive electrode collector 12. The coated amount of the paste for forming a positive electrode active material layer was adjusted to a total of about 16.8 mg/cm$^2$ (on the basis of solids) for both surfaces.

A graphite powder with an average particle size of 10 μm as a negative electrode active material, a styrene-butadiene rubber (SBR) as a binder, and carboxymethyl cellulose (CMC) as a thickening agent were mixed in water to obtain a mass ratio of these materials of 98:1:1 and a paste for forming a negative electrode active material layer was prepared. The paste for forming a negative electrode active material layer was coated in a band-like manner on both surfaces of a copper foil (negative electrode collector 22) of an elongated shape and a thickness of 10 μm and dried. As a result, the negative electrode sheet 20 was produced in which the negative electrode active material layer 24 was provided on both surfaces of the negative electrode collector 22. The coated amount of the paste for forming a negative electrode active material layer was adjusted to a total of about 9.2 mg/cm$^2$ (on the basis of solids) for both surfaces.

The spirally wound electrode body 80 was produced by spirally winding the positive electrode sheet 10 and the negative electrode sheet 20, with two separator sheets 40 being interposed therebetween. In this case, the porous layer 60 on the surface of the separator sheet and the negative electrode sheet 20 were disposed to face each other, and the spiral winding was conducted such that the thickest portion 66 of the porous layer 60 was positioned on the winding center side of the spirally wound electrode body. The spirally wound electrode body 80 obtained in the above-described manner was accommodated together with the nonaqueous electrolytic solution in a cylindrical battery container 50 and the opening of the battery container 50 was air-tightly sealed. A nonaqueous electrolytic solution in which $LiPF_6$ as a support salt was contained at a concentration of about 1 mol/L in a mixed solvent including ethylene carbonate (EC), ethyl methyl carbonate (EMC), and dimethyl carbonate (DMC) at a volume ratio of 1:1:1 was used as the nonaqueous electrolytic solution. The lithium secondary battery 100 was thus assembled. A lithium secondary battery for a test was then obtained by performing initial charge/discharge treatment (conditioning) by the usual method. For comparison, a lithium secondary battery was produced by using a separator sheet in which no porous layer was formed on the surface (sample 14).

TEST EXAMPLE 4

Charge/Discharge Cycle Test

A charge/discharge cycle test was performed with respect to each of the lithium secondary batteries fabricated in Test Example 3. More specifically, a total of 1000 charge/discharge cycles were repeated, each cycle including charging at a temperature of 25° C. by a constant current method at a current of 2 C to a voltage of 4.1 V, then charging by a constant voltage method at a current of 1/20 C and a voltage of 4.1 V, stopping the charging for 1 min and then discharging by a constant current method at a current of 2 C to a voltage 3 V. A capacity retention ratio after the charge/discharge cycle test (=[(discharge capacity after the charge/discharge cycle test)/ (initial capacity before the charge/discharge cycle test)]×100) was calculated from the initial capacity before the charge/discharge cycle test and the discharge capacity after the charge/discharge cycle test. The results are shown in the corresponding locations in Table 1.

As follows from Table 1, in the lithium secondary batteries of samples 1 to 12, which were provided with a difference in thickness in the porous layer, the capacity retention ratio tended to be higher and the cyclic endurance was better than those in the battery of sample 13 in which the difference in thickness was 0 µm and the battery of sample 14 in which no porous layer was provided.

The comparison of samples 1 to 5 demonstrates that in the case of the aforementioned tested batteries, the difference in thickness d between the thickest portion and the thinnest portion of 2 µm to 4 µm made it possible to obtain a very high capacity retention ratio of equal to or higher than 80%, these examples being not particularly limiting. Further, the comparison of samples 3 and 6 to 9 demonstrates that by setting the porosity of the porous layer to a value equal to or higher than 45%, it was possible to obtain a very high capacity retention ratio of equal to or higher than 80%. In addition, the comparison of samples 2 to 4 and 10 to 12 demonstrates that cyclic endurance could be increased regardless of the material type of the separator sheet.

TEST EXAMPLE 5

Forced Internal Short Circuit Test

A total of five lithium secondary batteries of each type fabricated in Test Example 3 were produced and a forced internal short circuit test was performed with respect to each battery. The forced internal short circuit test was conducted according to JIS C8714 by using a L-shaped small nickel piece with each side of 1 mm. The piece had a height of 0.2 mm and a width of 0.1 mm. The number of NG batteries that demonstrated abnormal heat generation was evaluated. The results are shown in the corresponding location in Table 1.

As shown in Table 1, the number of lithium secondary batteries of samples 1 to 13 in which the porous layer was formed that demonstrated abnormal heat generation was clearly less and safety was higher than those of the batteries of sample 14 in which no porous layer was formed. The comparison of samples 3 and 6 to 9 demonstrates that in the case of the aforementioned tested batteries, setting the porosity of the porous layer to a value equal to or less than 65% made it possible to realize batteries with higher safety, these examples being not particularly limiting.

The present invention is described above on the basis of preferred embodiments thereof, but this description is not limiting and it goes without saying that various modifications are possible.

For example, the porous layer disclosed herein is an interface of the separator sheet and the negative electrode layer and formed on the surface of the separator sheet on the negative electrode sheet side, but this configuration is not limiting. Thus, the porous layer may be formed on the surface of the separator sheet on the positive electrode sheet side, or on the surface of the positive electrode sheet, or on the surface of the negative electrode sheet.

Further, the porous layer disclosed herein is formed to increase gradually in thickness from the winding outer side to the winding center side of the spirally wound electrode body, but this configuration is not limiting. Thus, a step-like porous layer can be formed in which the thickness changes in a stepwise manner.

The shape (outer shape or size) of the lithium secondary battery to be produced is not particularly limited as long as the battery has a configuration in which the porous layer disclosed herein is provided on the separator sheet surface. Thus, the outer shape may be of a thin sheet type constituted by laminated films or the like, or the outer battery case may have a cylindrical shape or a rectangular parallelepiped shape, or the battery may have a small button shape.

Figure 7:
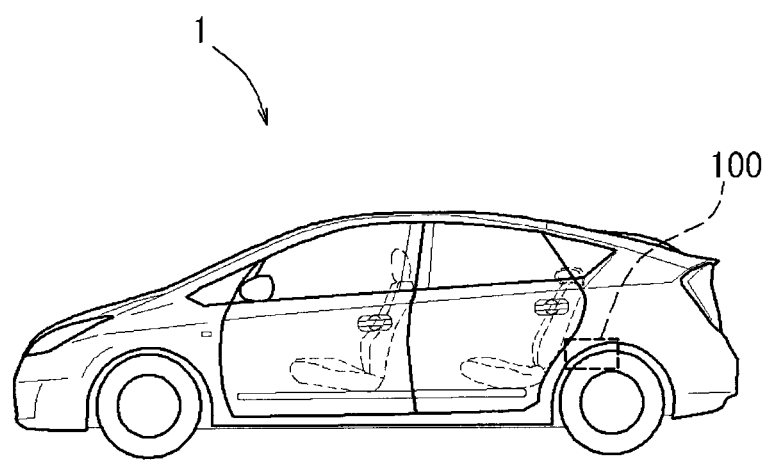
FIG. 7 is a side view showing schematically a vehicle equipped with the lithium secondary battery according to one embodiment of the present invention.

Any of the lithium secondary batteries 100 disclosed herein demonstrates performance suitable for a battery to be installed on a vehicle (for example, a high output can be obtained). In particular, excellent endurance in high-rate charge/discharge cycles can be obtained. Therefore, the present invention can provide a vehicle 1 equipped with any of the lithium secondary batteries 100 disclosed herein, as shown in FIG. 7. In particular, the vehicle 1 (for example, an automobile) equipped with the lithium secondary battery 100 as a power source (typically, a power source of a hybrid vehicle or an electric vehicle) is provided.

Examples of the preferred application objects of the features disclosed herein include the lithium secondary battery 100 that can supposedly be used in charge/discharge cycles including a high-rate discharge at a current of equal to or higher than 50 A (for example 50A to 250 A), and even equal to or higher than 100 A (for example 100 A to 200 A) and a lithium secondary battery that can supposedly be used in charge/discharge cycles including high-rate charge/discharge of a high capacitance type with a theoretic capacitance of equal to or higher than 1 Ah (even equal to or higher than 3 Ah) and 2 C or above (for example 2 C to 50 C) and even 10 C or above (for example 10 C to 40 C).

Industrial Applicability

With the features of the present invention, it is possible to provide a lithium secondary battery with increased endurance in charge/discharge cycles.

The invention claimed is:

1. A lithium secondary battery comprising an electrode body having a positive electrode sheet and a negative electrode sheet being wound with a separator sheet, the separator sheet being between the positive electrode sheet and the negative electrode sheet, wherein
   a porous layer is formed on a surface of at least one of the positive electrode sheet, the negative electrode sheet, and the separator sheet, and wherein
   the porous layer formed on a winding start side of the surface is thicker than the porous layer formed on a winding end side of the surface.

2. The lithium secondary battery according to claim 1, wherein an average thickness of the porous layer formed in an area of up to 20% of the sheet from an end portion on the winding start side is larger than an average thickness of the porous layer formed in an area of up to 20% from an end portion on the winding end side.

3. The lithium secondary battery according to claim 1, wherein the porous layer is formed such as to increase gradually in thickness from the winding end side to the winding start side of the sheet.

4. The lithium secondary battery according to claim 1, wherein
the porous layer has a thickest portion with a largest thickness and a thinnest portion with a smallest thickness, and
a difference in thickness between the thickest portion and the thinnest portion is 2 μm to 4 μm.

5. The lithium secondary battery according to claim 1, wherein a porosity of the porous layer is 45% to 65%

6. The lithium secondary battery according to claim 1, wherein the porous layer is constituted by metal compound particles.

7. The lithium secondary battery according to claim 1, wherein the porous layer is formed on a surface of the separator sheet.

8. The lithium secondary battery according to claim 7, wherein the porous layer is formed on a surface of the separator sheet on a negative electrode sheet side.

9. A method for manufacturing the lithium secondary battery according to claim 1, the method comprising the step of:
coating and drying a coating material for forming a porous layer with coating means on a surface of at least any one traveling sheet from among a positive electrode sheet, negative electrode sheet, and separator sheet to form the porous layer, wherein
the coating material for forming a porous layer is coated, while changing a traveling speed of the sheet.

10. The manufacturing method according to claim 9, wherein
the coating means is a gravure roll, and
the coating material for forming a porous layer is coated, while changing a rotation speed of the gravure roll.

11. The manufacturing method according to claim 9, wherein
a porous layer corresponding to a plurality of batteries is continuously formed on the traveling sheet surface.

12. A vehicle equipped with
a lithium secondary battery comprising an electrode body having a positive electrode sheet and a negative electrode sheet being wound with a separator sheet, the separator sheet being between the positive electrode sheet and the negative electrode sheet, wherein
a porous layer is formed on a surface of at least one of the positive electrode sheet, the negative electrode sheet, and the separator, and wherein
the porous layer formed on a winding start side of the surface is thicker than the porous layer formed on a winding end side of the surface, or
a lithium secondary battery manufactured by the manufacturing method according to claim 9.

* * * * *